(12) United States Patent
Safavi

(10) Patent No.: US 9,343,004 B2
(45) Date of Patent: *May 17, 2016

(54) LCD TFT SIGN FOR ON-BOARD USE IN PUBLIC TRANSPORTATION

(71) Applicant: LUMINATOR HOLDING L.P., Plano, TX (US)

(72) Inventor: Ramin Safavi, Plano, TX (US)

(73) Assignee: LUMINATOR HOLDING L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,154

(22) Filed: Feb. 11, 2014

(65) Prior Publication Data

US 2014/0157636 A1 Jun. 12, 2014

Related U.S. Application Data

(63) Continuation of application No. 13/050,696, filed on Mar. 17, 2011, now Pat. No. 8,677,662.

(60) Provisional application No. 61/314,946, filed on Mar. 17, 2010.

(51) Int. Cl.
*G09F 9/35* (2006.01)
*G09F 13/24* (2006.01)
(Continued)

(52) U.S. Cl.
CPC .......... *G09F 13/24* (2013.01); *G02F 1/133308* (2013.01); *G02F 1/133603* (2013.01); *G09F 21/04* (2013.01); *G09G 3/3413* (2013.01); *G09G 3/3426* (2013.01); *G09G 3/3611* (2013.01); *G02F 2001/13332* (2013.01); *G02F 2001/133314* (2013.01); *G02F 2001/133331* (2013.01); *G09F 21/045* (2013.01);
(Continued)

(58) Field of Classification Search
CPC ......... G09F 19/08; G09F 11/34; G09F 19/02; G09F 11/23; A63H 33/26
See application file for complete search history.

(56) References Cited

U.S. PATENT DOCUMENTS

2003/0210152 A1 11/2003 Cothern et al.
2008/0117346 A1* 5/2008 Jepsen ............................. 349/42
2010/0225640 A1* 9/2010 Vieri et al. ..................... 345/214

FOREIGN PATENT DOCUMENTS

CN 2280973 Y 5/1998
CN 201017561 Y 2/2008
(Continued)

OTHER PUBLICATIONS

Pierre de Greef and Hendriek Groot Hulze NXP Semiconductors (Founded by Philips) et al: "39.1: Adaptive Dimming and Boosting Backlight for LCD-TV Systems", SID 2007 International Symposium, Society for Information, Los Angeles, California, USA, vol. XXXVIII, May 20, 2007, pp. 1332-1335.

*Primary Examiner* — Cassandra Davis
(74) *Attorney, Agent, or Firm* — Howison & Arnott, LLP

(57) ABSTRACT

An LCD destination sign is provided that provides a high resolution image and operates in at least two modes. One mode is a destination message mode that is used when a destination message (i.e., a route number and/or destination name in substantially static alphanumeric or symbols) is to be displayed on the destination sign. The second mode is a non-destination mode wherein graphic images are displayed on the destination sign, wherein such graphic images do not provide a destination message and may include video feeds, weather forecasts or newsreels.

20 Claims, 7 Drawing Sheets

(51) Int. Cl.
*G02F 1/1333* (2006.01)
*G02F 1/1335* (2006.01)
*G09F 21/04* (2006.01)
*G09G 3/34* (2006.01)
*G09G 3/36* (2006.01)

(52) U.S. Cl.
CPC ...... *G09G2320/062* (2013.01); *G09G 2340/14* (2013.01); *G09G 2380/10* (2013.01)

(56) References Cited

FOREIGN PATENT DOCUMENTS

| | | |
|---|---|---|
| EP | 1983506 A1 | 10/2008 |
| KR | 100643196 | 11/2006 |
| WO | 2006018304 A2 | 2/2006 |

* cited by examiner

DESTINATION MESSAGE MODE

NON-DESTINATION MESSAGE MODE

US 9,343,004 B2

LCD TFT SIGN FOR ON-BOARD USE IN PUBLIC TRANSPORTATION

CROSS-REFERENCE TO RELATED APPLICATIONS

This application is a continuation of U.S. patent application Ser. No. 13/050,696, filed Mar. 17, 2011, entitled LCD TFT SIGN FOR ON-BOARD USE IN PUBLIC TRANSPORTATION, which claims benefit of U.S. Provisional Application No. 61/314,946, filed Mar. 17, 2010, entitled LCD TFT SIGN FOR ON-BOARD USE IN PUBLIC TRANSPORTATION, the specifications of which are incorporated herein by reference in their entirety.

TECHNICAL FIELD

The embodiments of the present invention relate in general to on-board destination signs used in public transportation vehicles, and more particularly but not by way of limitation, to system and methods for electronic destination signs having liquid crystal displays (LCDs).

BACKGROUND

Signage is a critical aspect of communication in our organized society. Signage used in the public-transit industry is a well known example of the critical usage of such communication. A plurality of signs may often be positioned in and/or around a bus, train, or other mode of transit to display information to passengers, potential passengers, and/or other observers. A destination sign or destination indicator is a sign mounted on the front or side interior or exterior of a public transport vehicle, such as a bus, tram, streetcar or light rail vehicle. A destination sign displays the vehicle's route number and/or destination, or the route's number and name when a transit system utilizes route names. The main destination sign is usually mounted on the front of the vehicle in a location above (or at the top of) the windshield. This main sign is often called the headsign. For example, as shown in FIG. 1, a bus 10 may display route or destination information on a headsign 12 disposed on the outside thereof. The headsign information can easily be observed and read by a passer by. Rider decisions are often based on such signs. The destination information or destination message may include the name of the route that the particular bus is servicing so that potential passengers waiting at a bus stop will know which bus to board. Depending on the type of the sign, it may also display intermediate destination points on the current route, especially if the route is particularly long and its final terminus, by itself, is not very helpful in determining where the vehicle is going. Similarly, destination signs are often disposed inside a bus or train to provide passengers inside the bus or train with information such as the name of the next or present stop on the bus or train route. An interior destination sign 14 may be mounted on an interior side or interior forward portion ceiling, or wall of a bus or train. FIG. 2 depicts a ceiling mount destination sign 16 and wall mount destination sign 18 found in the interior of a mass-transit light rail vehicle.

Several different types of technology have been used for destination and other signs on a bus, train, or rail car. Such different types of technology range from simple rigid placards held in place by a frame or clips, to rollsigns, to various types of computerized or electronically controlled signs, such as flip-disc, LCD or LED style displays. For many decades, the most common type of multiple-option destination sign was the rollsign, or indicator blind. These consist of a roll with pre-printed route numbers/letters and destinations (or route names), which is turned by the vehicle operator at, for example, the end of the route when reversing direction, either by a hand crank or by holding a switch if the rollsign mechanism is motorized.

One of the first electronic signs widely used for public-transit signs were flip-disc, or "flip-dot" displays 20, such as the one shown in FIG. 3. These flip-dot displays are limited in their display capabilities to a dot matrix display. In general, dot matrix displays are suitable for displaying information on machines, clocks, railway departure indicators and many other devices requiring a simple display of limited resolution. Such dot-matrix displays consist of a matrix of mechanical indicators arranged in a rectangular configuration (other shapes are also popular, although not common) such that by switching on or off selected lights or flipping selected light or dark colored dots, text or low resolution graphics is displayed. More recently, LED and LCD panels have replaced the mechanical indicators of flip-dot displays. The recent LED and LCD displays consist of a plurality of discrete lights organized to be generally limited to dot-matrix display formats. The use of dot-matrix displays in public transportation has been widely adopted because of various regulatory requirements such as, for example, the regulatory requirements required by the American Disabilities Act (ADA) that specify design criteria for transit-vehicle destination signs, including maximum and minimum character height-to-width ratio and contrast levels between lettering illumination and color and a black background. The various regulatory requirements were enacted to ensure that destination signs on transit vehicles are sufficiently readable to visually impaired persons.

Dot-matrix destination signs, as discussed above, still have limited resolution even though newer LCD or LED technology has been incorporated into their design. Thus, what is needed is a light-weight electronic signage system that meets or exceeds the regulatory requirements for public transportation destination signs, by providing improved high visibility and readability along with higher graphic image resolution that overcomes the limitations of former dot-matrix destination display designs.

SUMMARY

Embodiments of the present invention relate to electronic signs for use as on-board next stop sign (OBNSS) signs systems in busses, trains, or other public-transit vehicles. In various embodiments, an OBNSS may include a thin-film transistor (TFT) liquid crystal display (LCD). An exemplary TFT LCD display for use in a bus or rail application may have a wide aspect ration in one or multiple panels and may have wide vertical and horizontal viewing angles. An exemplary OBNSS may further include a backlight assembly that will illuminate the TFT LCD display in different manners depending on the mode that the OBNSS sign is operating in. For example, the backlight assembly may operate in a first mode that enhances the contrast and readability of a destination message or information being displayed. Alternatively, the backlight assembly may operate in a second or third mode when the OBNSS sign is displaying information or graphics other than destination information or messages. Such other information or graphics may include graphical weather information, newsreels, or video streams that may be of viewing interest to the passengers on the public-transit vehicle.

In various embodiments, the OBNSS may have high temperature range capability and may include full color in VGA, XVGA or higher resolution, including but not limited to, high definition (HD) graphics. In various embodiments, the OBNSS may be capable of displaying a destination message or other information on full screen or multiple messages, data or graphics on different windows on the display screen. An exemplary OBNSS may simulate or emulate a dot-matrix style destination message or provide high resolution destination messages that meet and/or exceed the visibility and readability of United States regulatory requirements and/or other countries for destination signage on public transportation vehicles. An exemplary display may have a low-glare, protective front viewing surface and be provided with multiple modes of backlighting such that the display is easily readable in high or low lighting environments. The embodiments may have input/output connections for receiving a communicating with external devices that provide graphic and/or video and data streams. Such input and such output connections may include, but are not limited to TCP/IP, RS485, RS422, and/or DVI/HDMI formats. In some embodiments, an OBNSS may operate with low or very low power consumption and incorporate an automatic dimming feature that adjusts the back lighting illumination intensity in accordance with the ambient lighting conditions. An exemplary OBNSS may be capable of displaying text, graphics, animation, and/or MPxx or other digital movie or digital video formats. In some embodiments, the OBNSS may include a lightweight frame having the capability to tilt the display panel to establish a better viewing angle based on the destination signs installation height.

Embodiments of the invention provide a destination sign for a public-transit vehicle comprising a front bezel assembly. The front bezel assembly has a bezel front side and bezel side walls that extend backwards from the periphery of the bezel front side to establish an enclosure about the bezel back side. There is a viewing aperture through the bezel front side to the bezel back side. In some embodiments the width-to-height ratio of the aperture is between about 8:1 and about 4:1. A transparent protective, non-glare cover sheet that may be positioned against the bezel back side and cover the aperture. A cover LCD display panel is mounted within the bezel enclosure behind the aperture and cover sheet such that the display surface of the color LCD display panel faces the aperture. The display surface of the LCD display panel may have an aspect ratio of between about 8:1 and about 4:1. The color LCD display panel is adapted to produce a first image at a first resolution. A backlight assembly is positioned within the bezel enclosure and behind the color LCD display panel such that an illumination surface of the backlight assembly faces the aperture and the back of the color LCD display panel. The illumination surface comprises an array of LEDs adapted to produce a color spectrum of light. The illumination surface is further adapted to produce a first illumination output comprising the first or same image produced on the color LCD display panel, but at a same or lower resolution than the first resolution. The illumination surface is further adapted to produce a second output comprising substantially of white light. A graphic data bus, which is connected to the color LCD display panel, provides a first graphic signal to the color LCD display panel. The first graphic data signal comprises the first image formatted for display on the color LCD display panel. A mode signal connection, which provides a mode signal, is connected to the backlight assembly. The mode signal indicates whether the backlight assembly should operate in a destination message mode wherein the first output is produced on the illumination surface or operate in a non-destination message mode wherein the second output is produced on the illumination surface.

Additional embodiments include a mode select circuit adapted to receive the mode signal and the first graphic data signal. The mode select circuit is further adapted to provide a second graphic data signal to the backlight assembly when the mode signal indicates that the backlight assembly should operate in the destination message mode. The second graphic data signal comprises the first image formatted for display on the illumination surface. The mode select circuit is further adapted to provide a third graphic data signal to the backlight assembly when the mode signal indicates that the backlight assembly should operate in the non-destination message mode. The third graphic data signal indicates that the illumination surface should produce white light. In additional embodiments, the illumination assembly may also produce "locally dimmed" white light when the mode signal indicates operation in the non-destination message mode.

In various embodiments the illumination surface of the backlight assembly comprises an array of clustered red, green and blue LEDs in an array capable of producing graphic images illuminated with a resolution ranging from about 10% to 100% of the display resolution of the color LCD display panel. Instead of clustered red, green and blue LEDs, tri-color LEDs or low/high resolution OLEDs may be used for the illumination surface of the backlight assembly.

Additionally, various embodiments, when operating in the destination message mode, combine the illumination backlight output of the backlight assembly and the graphics capability of the LCD display panel to produce a destination message that meets or exceeds the American Disabilities Act requirements for public-transit destination and route signs.

Embodiments provide a method of displaying a destination message on a backlit LCD destination sign, wherein the backlit LCD destination sign comprises a color LCD display panel and a backlight assembly, which is adapted to backlight the color LCD display panel. The method comprises the backlit LCD destination sign receiving a first image signal from an external source. A mode select circuit determines whether the first image signal is intended to be a destination message image or a non-destination message image. When the mode select circuit determines that the first image is for a destination message image, then a first image (i.e., the destination message) is simultaneously displayed on both the color LCD display panel and on the backlight assembly. When the mode select circuit determines that the first image is for a non-destination message image, then the first image (i.e., the non-destination message image) is displayed on the color LCD display panel and the backlight assembly is set to produce substantially white light or white light with local dimming.

In additional methods of displaying a destination message on a backlit LCD destination sign, the mode signal select circuit also receives a mode signal from an external source indicating whether the backlight assembly is to operate in a destination message mode or in a non-destination message mode, wherein when in destination message mode the destination message image is simultaneously displayed on the color LCD display panel and on the backlight assembly.

The above summary of the invention is not intended to represent each embodiment or every aspect of the present invention. It should be understood that the various embodiments disclosed herein can be combined or modified without changing the spirit or the scope of the invention.

BRIEF DESCRIPTION OF THE DRAWINGS

A more complete understanding of the method and apparatus of the present invention may be obtained by reference to the following Detail Description when taken in conjunction with the accompanying Drawings wherein.

DETAILED DESCRIPTION

Figure 1:
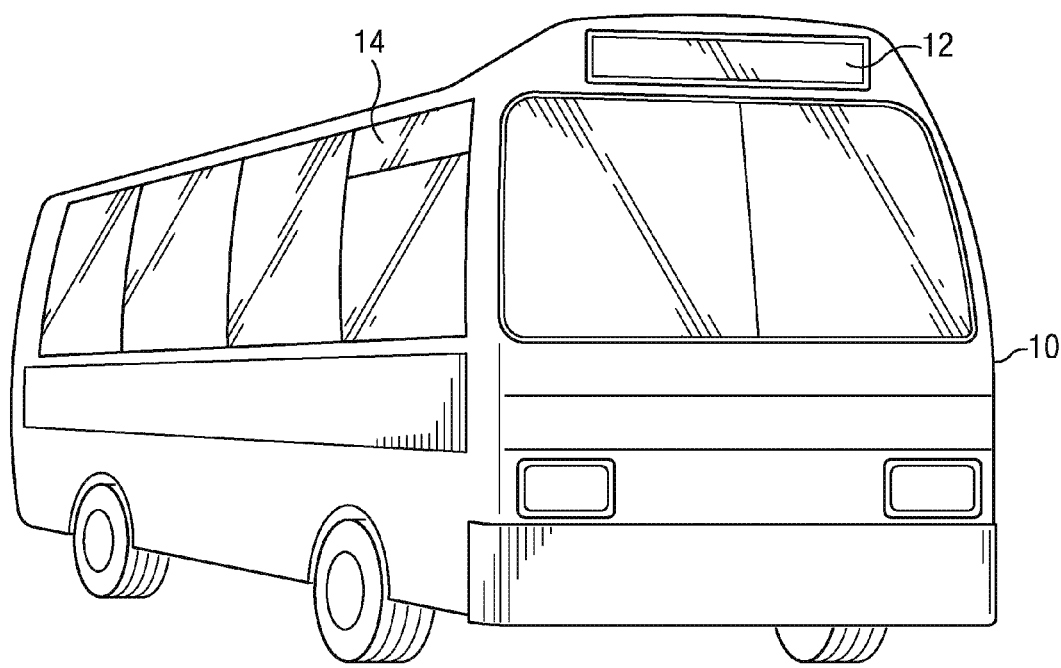
FIG. 1 is a perspective view of an outside of a bus.
Figure 3:
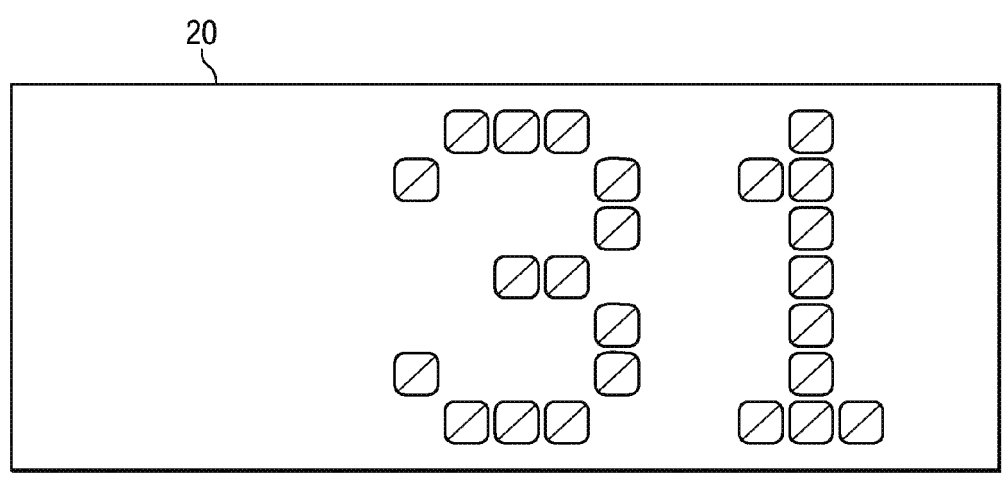
FIG. 3 is a front view of a dot-matrix display.
Figure 2:
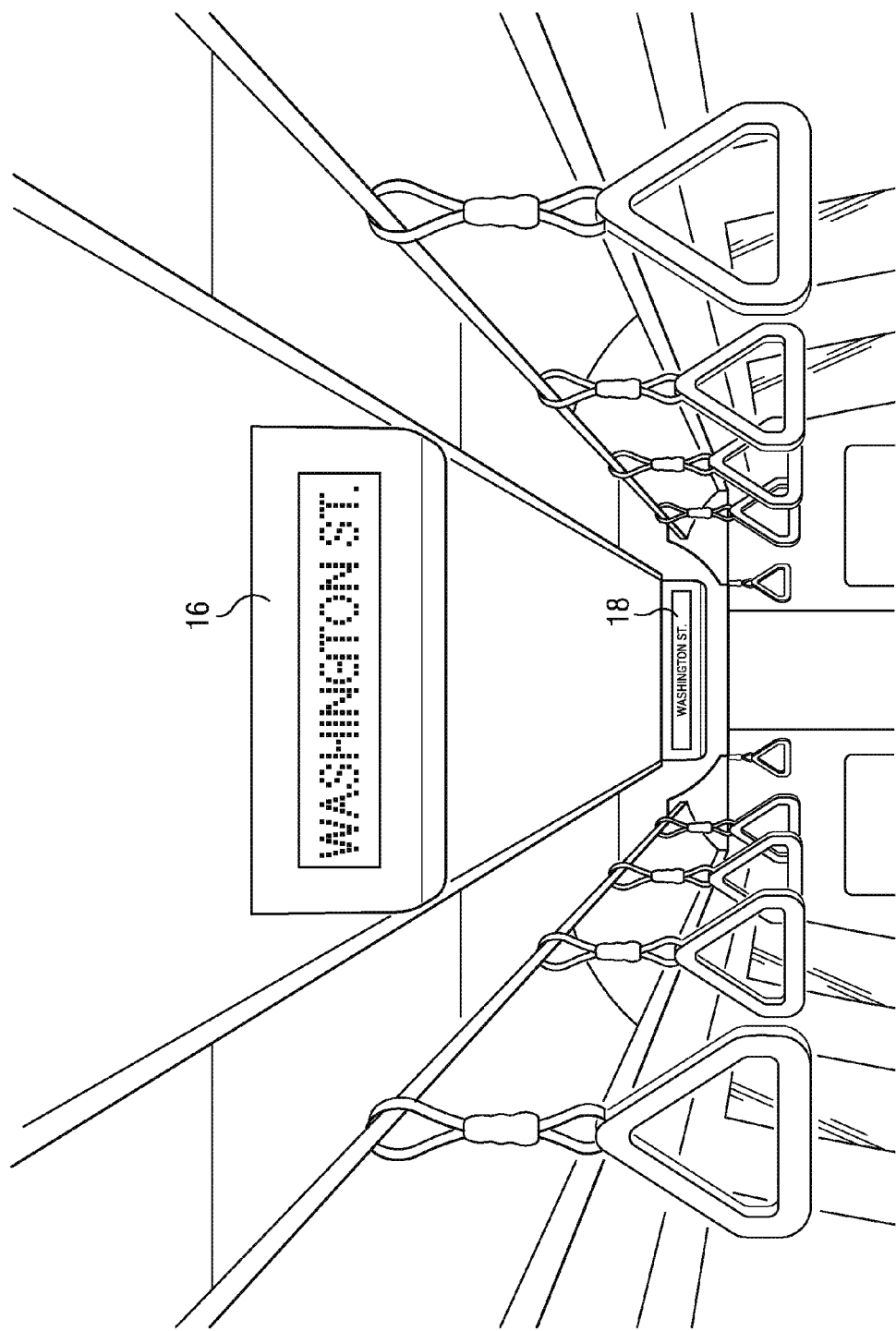
FIG. 2 is an interior view of a mass-transit train.

Liquid Crystal Display (LCD) technology has been around for many years and is commonly used in televisions, digital wrist watches, and other electronic display devices. A LCD is a thin, flat electronic visual display that uses the light modulating properties of liquid crystals (LCs). Liquid crystals do not emit light directly. Each pixel of a LCD typically consists of a layer of molecules aligned between two transparent electrodes and two polarizing filters, the axis of transmission of which are (in most of the cases) perpendicular to each other. With no actual liquid crystal between the polarizing filters, light passes through the first filter and may be blocked by the second (crossed polarizer). By this means LCDs allow or do not allow light from a back lighting mechanism to shine through the LCD to produce the resulting image. As LCD panels produce no light of their own, they require an external lighting mechanism or assembly in order to make an image, produced on the LCD panel, visible. In the past, it has been very common for a back lighting mechanism to consist of cold cathode fluorescent lamps CCFLs that produce white light to be situated behind an LCD panel. LCD panels that are referred to as active-matrix displays almost always require backlighting. Recently, two types of LED backlit LCD displays have appeared in some televisions as an alternative to CCFL conventional backlighting of LCD panels. In one scheme, white LEDs are used to backlight the entire LCD panel. In another scheme, red, green and blue LEDs are clustered repeatedly on a backlighting panel and combined to produce a white light for backlighting the LCD panel. The white light produced by the combination of the clustered red, green and blue LEDs has been found to improve the contrast between color image and the black level viewed on an LCD display. For example, RGB (clustered red, green and blue) LEDs emitting white light in one section of the screen can be dimmed to produce a dark section of the display image while the RGB clustered white light producing LEDs in another section are kept bright. This RGB clustered LED technique of producing locally dimmed white backlight is sometimes called dynamic RGB backlighting.

High-resolution color displays, such as those used in modern LCD computer monitors and televisions use an active matrix LCD structure. Such high-resolution color LCD displays utilize backlighting, for example, white LED edge lighting or white LED entire LCD panel illumination, or RGB clustered LEDs that produce a white light output. Thus, color LCD displays require backlighting of some form. The LCD displays operate by blocking the white light illuminated from the backlighting so as to darken it to produce the viewed color or to create a dark, black area.

One type of LCD display on the market today uses thin-film transistor (TFT) technology as the active mechanism and is what is used in many flat-screen TVs and computer monitors. Use of fluorescent or cold cathode fluorescent lamps (CCFLs) are not desirable in public transportation usage because of the amount of space required and the mercury gas contained therein. In more recent LCD displays, white light LED technology is used to provide a backlight. White light LED technology consumes less power than previous fluorescent or CCFL technologies, does not include mercury, and allows the resulting display panels to be thinner and lighter.

In some LCD displays that utilize LEDs to provide backlighting, the white LEDs surround the edge of the display panel such that their illuminated light is optically spread across the back surface of the LCD to provide backlighting. Although this edge lighting backlight technique works, this technique provides a relatively low contrast ratio and provides less detail in dark areas of the resulting LCD picture, which is not acceptable in public-transit applications. As such, embodiments of the present invention dispose a panel of clustered red, green and blue LED lights as a low resolution display positioned as a backlight assembly behind a LCD panel thereby producing a better contrast ratio for a variety of colors as well as an ability for darker areas of the picture to be dimmed, sometimes referred to as "local dimming," rather than dimming the entire picture.

Another shortcoming of traditional LCD displays has been that their useable viewing angles suffer from contrast degradation when viewed from angles wider than about 30 degrees off center. This creates a problem when mounting signs in a public-transit environment where the sign needs to be seen from a wide variety of angles. Oftentimes, a manufacturer makes single LCD panel models for use in a plurality of different viewing environments. Therefore, in exemplary embodiments wherein a LCD panel is to be used in a public-transit environment, the LCD panel needs to have a large viewing angle and/or a mounting system is incorporated to allow the LCD panel to be securely mounted within the passenger compartment and adjusted or tilted to take passenger viewing requirements into consideration. Embodiments of the present invention incorporate improved optical films in the LCD panel that have been developed and that give almost 180 degrees of viewing angle from right to left of the sign surface. In some embodiments the horizontal viewing angle ranges from 100 to almost 180 degrees from right to left across the viewing surface. Top to bottom viewing angles may still be restrictive, thus a mounting system that allows the LCD panel to be tilted for better passenger compartment viewing may be included in exemplary destination signs intended to be mounted in certain public-transit vehicle locations.

An additional requirement of many public-transit applications is that the area available for mounting a destination sign is limited. In general, computer monitors, televisions and other displays that commonly use LCD displays are available in sizes having aspect ratios ranging from about 4:3 to about 16:9, which cover standard-definition video formats through high-definition television formats. Such standard aspect ratios do not fit well in most mass-transit vehicles. Public-transit destination sign displays often must have an aspect ratio that is vertically very small and horizontally very wide. For example, referring to FIG. 4, an exploded front perspective view of an exemplary on-board next stop sign (OBNSS) or destination sign 30 is shown having a wide, narrow display screen 32. In the embodiment shown, the destination sign display screen 32 is approximately 17.5×2.13 inches and is enclosed in an exemplary mounting structure that is approximately 20×4×2.3 inches in size. Other embodiments may provide a display screen 32 that is about 20×5 inches. Thus, embodiments require LCD display screens having aspect ratios ranging from between about 8:1 and 4:1, which are unsupported LCD display screens in the industry. Furthermore, such exemplary LCD display screens can provide full color graphics with display resolutions ranging from standard VGA, XVGA to high definition digital video standards. While certain aspect ratios have been discussed herein, the aspect ratio and size may be any ratio or size as required by specified destination sign design criteria, such as, for example, having a display width between 15 and 35 inches and a height of between about 2 and about 6 inches.

Figure 4:
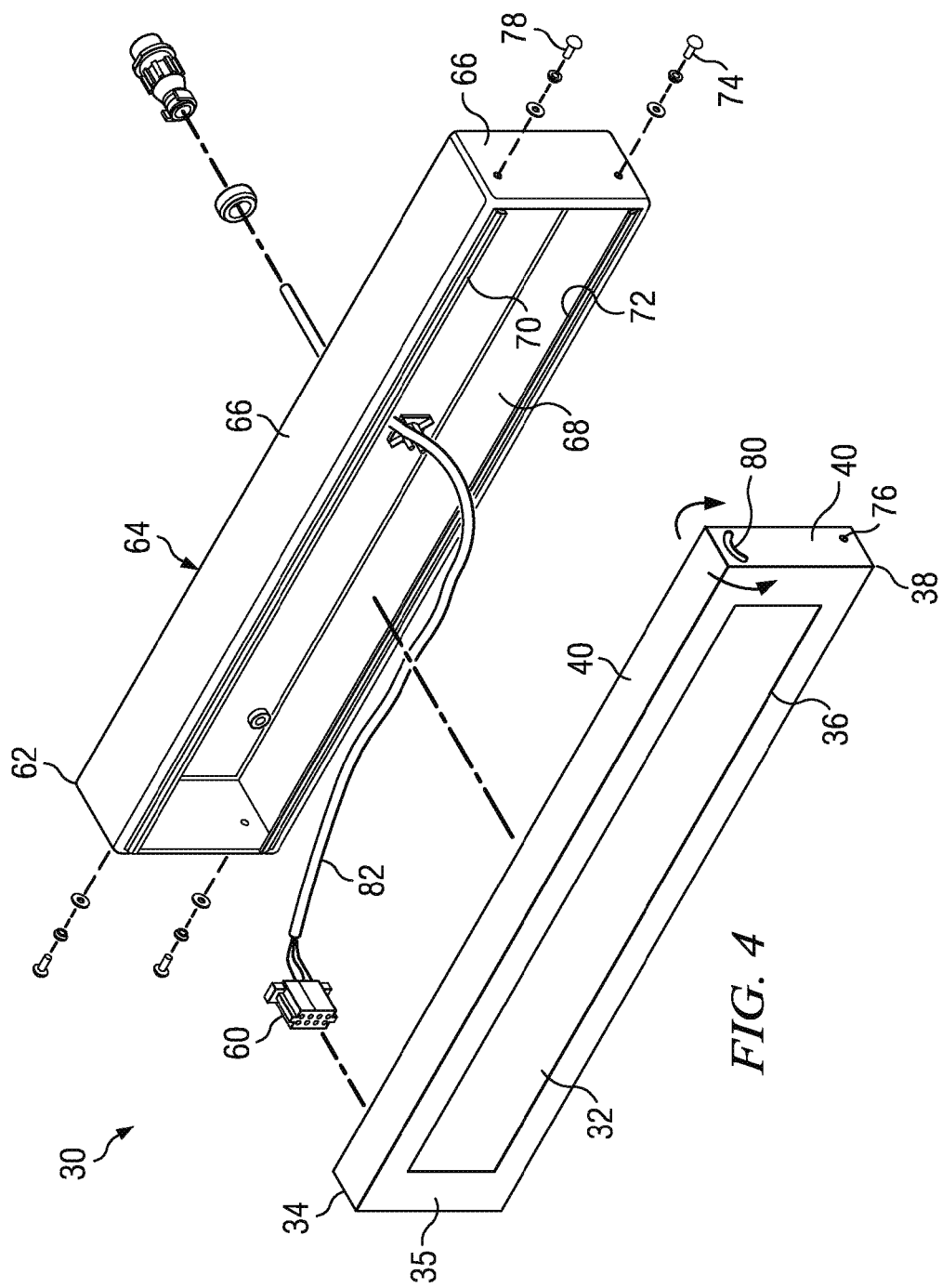
FIG. 4 is an exploded front perspective view of an exemplary destination or OBNSS sign.
Figure 5:
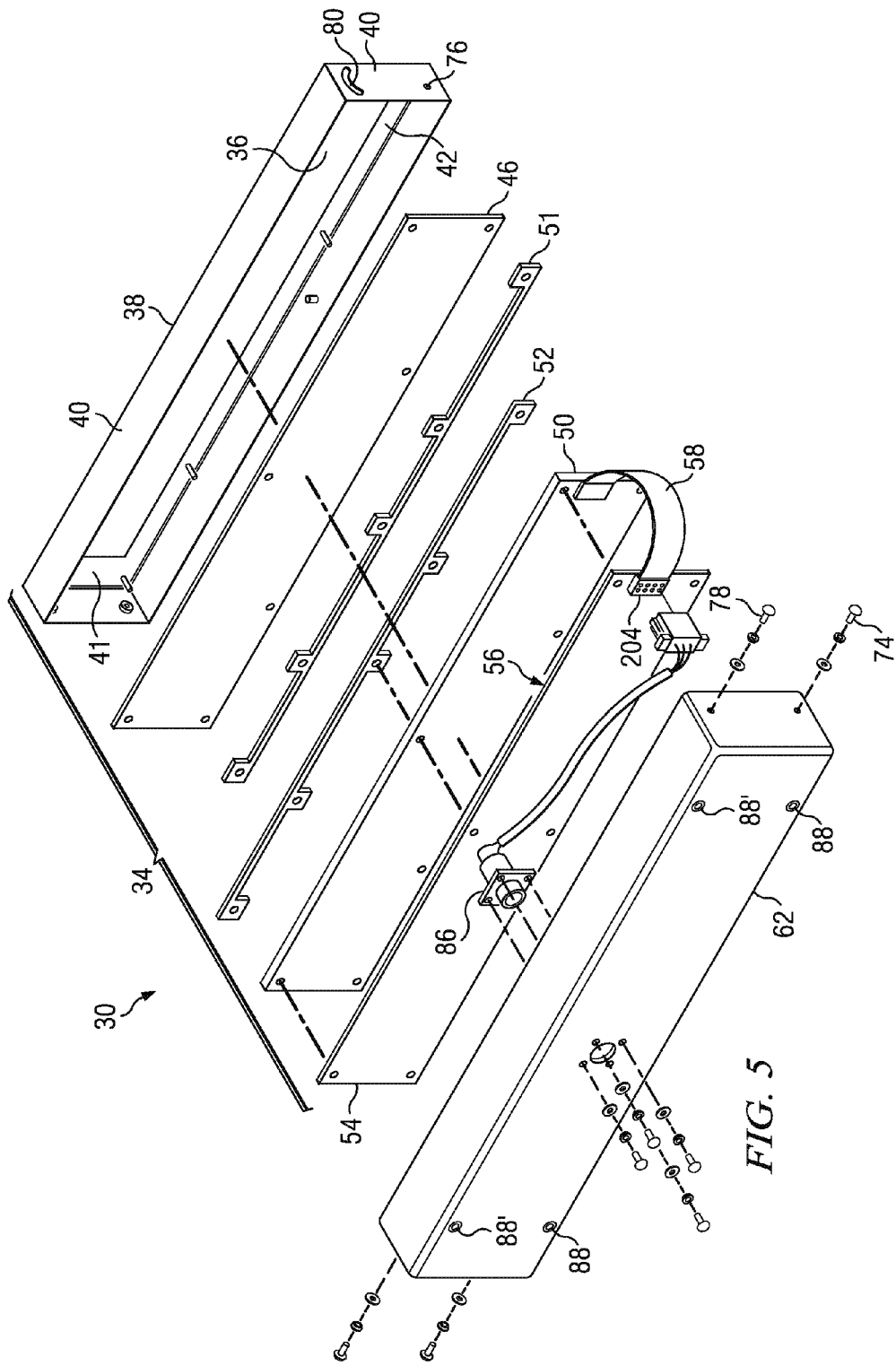
FIG. 5 is a further exploded back perspective view of an exemplary destination or OBNSS sign.

Referring to FIGS. 4 and 5, an exemplary display screen 32 is mounted within a front bezel assembly 34. The front side of the front bezel assembly 34 includes an aperture 36, which extends from the front side of the bezel 38 to the bezel back side 42. The bezel 38 has side walls 40 that extend backward from the top bottom and sides of the bezel front panel 35. The bezel side walls 40 establish a bezel enclosure 41 about the bezel back side 42.

Inside the bezel enclosure 41, a protective cover sheet 46 is positioned against the bezel back side 42 and covers the aperture 36. The cover sheet 46 is transparent and may be treated to have non-glare and/or polarized attributes. The cover sheet 46 is used to protect the front surface of the LCD TFT display 50 from scratches or other damage that may occur due to the destination sign's placement within a public-transit vehicle. The cover sheet 46 can be durable enough to be cleaned with various chemicals and helps minimize glare so that the underlying LCD TFT display 50 is easily visible to passengers. Optional spacers 51, 52 may be placed on the top and bottom edges of the cover sheet 46 and between the cover sheet 46 and the front side of the LCD display 50. If the optional spacers 51, 52 are not utilized the display surface of the display 50, in conjunction with the cover sheet 46 may be utilized as a touch screen for passengers to touch in order to, for example, request the transit vehicle to stop at the next scheduled stop or to display a route map or other graphical information.

Still referring to elements installed within the front bezel assembly 34 of this exemplary embodiment, a backlight assembly 54 is positioned behind the LCD display 50 such that the backlight assembly's illumination surface faces toward the aperture 36 and the back side of the LCD display 50. Illumination surface 56 of the backlight assembly 54 comprises an array of red, green and blue clustered LEDs or tri-colored LEDs organized as a LED display screen that may comprise a resolution, similar to that of a dot-matrix display, ranging from about 7×50 pixels to about 32×192 pixels. In other embodiments the illumination surface 56 of the backlight assembly 54 may comprise a LED graphical display screen that can provide an image resolution ranging from about 32×192 pixels to a CGA (color graphics adapter), VGA (video graphics adapter), SVGA (super video graphics array), or higher resolution graphics up to and including a HD (high definition) OLED display. The illumination surface 56 of the backlight assembly 54 may operate in one of a plurality of backlighting modes. The backlighting modes being a destination message mode and a non-destination message mode. The non-destination message mode may comprise a white light backlighting mode or a white light backlighting mode with local dimming. A ribbon cable or other wiring 58 is connected between the LCD display 50 and the backlight assembly 54. A connector 60 connects to the backlight assembly 54/LCD display 50 to provide power, one or more video graphic data feeds, and bidirectional communication lines that may be connected to an external device through, for example, the back side 64 of the destination sign housing 62.

Still referring to FIGS. 4 and 5, the housing 62 comprises housing side walls 66 that extend forward from the top and side periphery edges of the housing back side 64. The housing side walls form the top, bottom and sides of the housing 62, which establish a housing enclosure 68 having an opening on the front side of the housing that is large enough to surround the front bezel assembly 34. The front bezel assembly 34 interfits within the housing enclosure such that the aperture 36 and the front side 35 of the bezel assembly 34 face forward.

On the front edge of the top housing side walls is an upper lip 70. Similarly, along the front edge of the bottom housing side wall is a lower lip 72. The upper lip 70 and lower lip 72 establish a spaced area between the top bezel side wall and the inside of the top housing side wall. Again, similarly, the lower lip 72 establishes a spaced area between the bottom bezel side wall and the inner surface of the bottom housing side wall. An exemplary means for tilting or changing the viewing angle of the display screen 32 is provided by way of aligning and attaching the front bezel assembly 34 to the housing 62 via the lower bezel mounting screw 74 at the bezel mounting point 76 along with the upper bezel mounting screw 78 being secured to the front bezel tilt adjustment 80 found on both sides of the front bezel assembly 34 and housing 62. The tilt adjusting is a means that allows the front of the bezel assembly to tilt within the housing 62 to thereby allow for a vertical viewing angle adjustment. Other means for tilting or adjusting the viewing angle of an exemplary destination sign include, but are not limited to, additional tilt adjustment brackets located on the housing side walls or shims or spacers placed on the top portion of the housing back side surface 64 such that the overall destination sign 30 is tilted when mounted to a wall.

Input/output (I/O) connector 60, which attaches to the back side, or in some embodiments, to the side of the backlight assembly/LCD display combination, also connects to a communication cable 82, which may extend through the housing back side 64 (as shown in FIG. 4) or may attach to a destination sign I/O connector 86 that may be mounted on the housing back side 64 such that a communication cable and connector (not specifically shown) can be connected thereto. A means for mounting an exemplary destination sign is seen on the housing back side 64 in the form of mounting holes 88. Again, shims or spacers can be placed between the top mounting holes 88 to adjust the viewing angle of the display screen 32 secured within the front bezel assembly 34.

Figure 6:
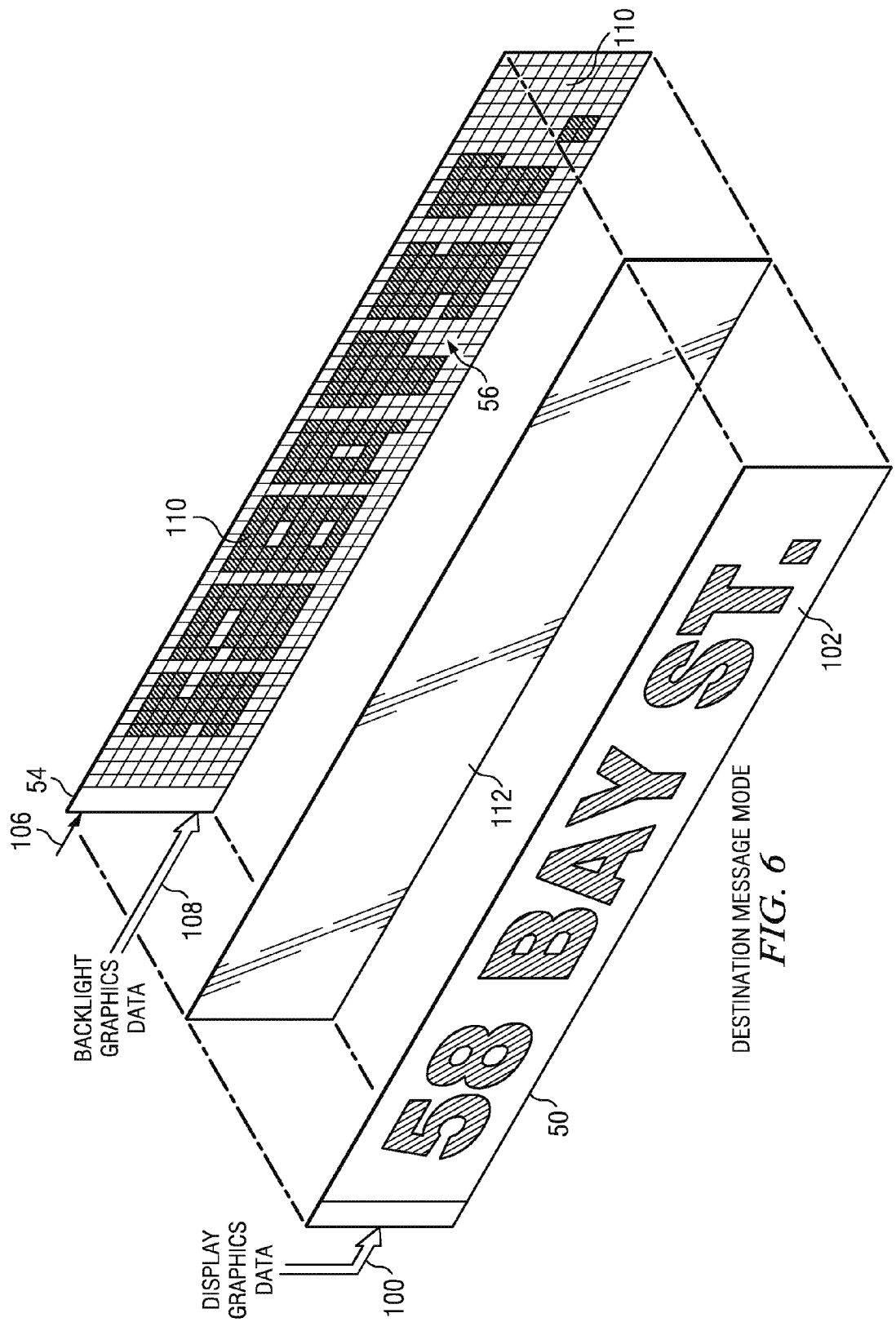
FIG. 6 depicts an exploded perspective view of an exemplary LCD TFT display panel and backlight assembly operating in a destination message mode.

Referring now to FIG. 6, a destination message mode of an exemplary destination sign is depicted. When an exemplary destination sign is in destination message mode, destination message graphics data is provided to the LCD display 50 via the LCD data bus 100. A destination message comprises a substantially static message in the form of letters or symbols that may include the name of the route that the particular transit-vehicle is servicing, a next destination that the transit vehicle will be stopping at or, depending on the type of the destination sign, it may also display intermediate points on the current route. The route number and, in some destination messages, the time of day may also be displayed as part of a destination message. The time of day is usually displayed in digital format showing the hour and minute in a substantially static manner (i.e., changing once per minute). In the United States, destination route signs are regulated by the American Disability Act (ADA) accessibility guidelines for transportation vehicle regulations. In particular the ADA regulations require, among other things, that characters on destination signs must have a width-to-height ration between 3:5 and 1:1 and a stroke width-to-height ratio between 1:5 and 1:10, with a minimum character height (using an upper case "X") of one inch for sides on the boarding side and a minimum character height of 2 inches for front "head signs", with "wide" spacing (generally, the space between letters shall be 1/16 of the height of upper case letters), and shall contrast with the background, either dark-on-light or light-on-dark.

Here the route number "58" and the next route destination "BAY ST." may be displayed on the LCD display 50 in accordance with the ADA character size and spacing requirements. The destination message "58 BAY ST." may be displayed in yellow, green, blue or other selected color lettering contrasting against a black color background 102. To maximize the contrast between the color of the destination message "58 BAY ST." against the black background 102, embodiments of the invention set the backlight assembly 54 to operate in a destination message mode. In some embodiments, the destination message mode is set by the mode signal 106 that is provided to the backlight assembly 54. When the mode signal 106 indicates that the backlight assembly 54 is to operate in destination message mode then backlight graphics data is provided to the backlight assembly 54 via the backlight data bus 108. The backlight graphics data comprises a same or lower resolution image of the display graphics data that is simultaneously being provided to the LCD display 50. In other words, the same destination message "58 BAY ST." is displayed in substantially the same color and in the same or a lower resolution on the illumination surface 56 of the backlight assembly 54. As can be seen in FIG. 6, the illumination surface 56 comprises an array of LED lights that combine to operate as color LED pixels 110 in a color LED display. Each LED pixel 110 may be comprised of a clustered red, green and blue LEDs or be a tri-color LED, which can illuminate the illumination surface 56 with the same, substantially similar, or lower resolution version of the destination message simultaneously being displayed on the LCD display 50. The LED pixels 110 that are not in a position requiring illumination (i.e., not part of a letter or symbol in the destination message) are off or dark. In this manner an exemplary embodiment displays a destination message to be viewed on the LCD display 50 with a maximized amount of contrast between a destination message letters and the black background 102. Furthermore since the LED pixels of the backlight assembly are illuminating in substantially the same color as that which is to be displayed on the LCD display 50 the color rendering or color gamut is clear and crisp with a high contrast against the background 102 as seen by those viewing an exemplary destination sign.

In some embodiments, an optional optical filter 112 may be positioned between the illumination surface 56 and the back side of the LCD display 50. The optional optical filter 112 may provide a prismatic, blurring or smoothing affect to help enhance the contrast and/or to help uniformly illuminate the areas of the LCD display 50 that require illumination while in the destination message mode.

In some embodiments, the backlight graphics data provided to the backlight assembly 54 via the backlight data bus 108 is identical to the display graphics data (for the destination message) provided to the LCD display 50 via the LCD data bus 100. Yet, in other embodiments the backlight graphics data provided to the backlight assembly 54 is in a low resolution format or provided in a blurry, bolded font, or expanded resolution such that the overall display resolution of the destination message displayed on the illumination surface 56 completely illuminates the high resolution destination message displayed on the LCD display 50. In some embodiments, the illumination surface 56 of the backlight assembly 54 is substantially a dot-matrix panel having LED color producing pixels 110 formed in a dot-matrix array ranging from being a dot-matrix resolution from about 7×50 pixels to about 64×384 pixels. In other embodiments the illumination surface of the backlight assembly may have a resolution similar to CGA, VGA, SVGA or even high definition graphic arrays. Other embodiments may use a low-resolution OLED or normal OLED display to backlight to LCD display 50. Yet, in other embodiments white LEDs or RGB LED clusters can be illuminated to produce a white light image on the illumination surface that is the same or of a lower resolution than the destination message letters or symbols displayed on the LCD display panel 50.

As such, when embodiments of an invention are operating in destination message mode, it should be understood that the exemplary backlighting technique goes beyond local dimming techniques by lighting a same or lower resolution color image of the same graphic and color being generated on the LCD TFT display panel. This technique of displaying a destination message on a destination sign is extremely useful for creating very high contrast, high resolution destination sign graphics of destination messages that meet and exceed the ADA requirements for signage on transportation vehicles.

Figure 7:
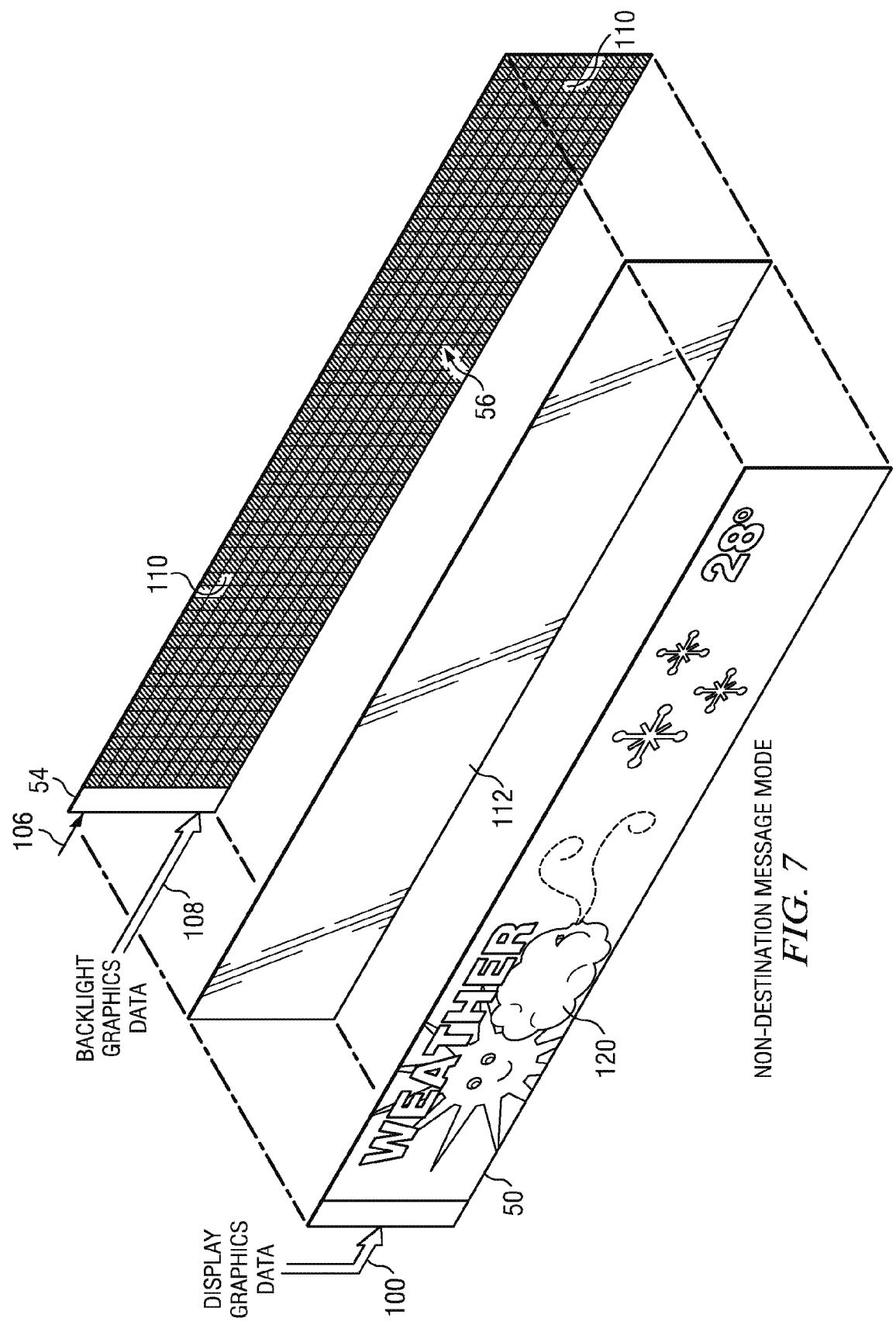
FIG. 7 depicts an exemplary LCD TFT display panel and backlight assembly operating in a non-destination message mode.

Referring now to FIG. 7, an exemplary LCD display panel and backlight assembly is shown operating in a non-destination message mode. Here a color graphic image or a video image 120 is displayed on the LED display 50. Display graphics data or video graphics data is provided to the LCD display 50 via the LCD data bus 100. Here the color graphic image or video 120 is shown to be the local weather wherein the animated sun is graphically displayed as being partially hidden by a cloud that is blowing wind toward snowflakes and wherein the outside temperature is being indicated as being 28° F. Here the color graphic image 120 may be substantially static or in full color VGA, XVGA or even high definition moving video graphics. A mode signal 106 is applied to the backlight assembly 54, which sets the illumination surface 56 to illuminate the red, green and blue LED bundles or tri-colored LEDs to illuminate as a uniform white light to backlight the color graphic image 120 displayed on the LED display 50. This technique, sometimes referred to as RGB LED backlighting is similar or identical to the RGB LED backlighting used in LCD LED televisions and monitors.

Additionally, an exemplary LCD display panel and backlight assembly may operate in the second non-destination message mode wherein the backlight assembly's illumination surface 56 operates in accordance a RGB dynamic LED mode, which is a method of backlighting that allows dimming to occur in locally specific areas of darkness on the screen. When in this second non-destination message mode is enabled, backlight graphics data is delivered to the backlight assembly 54 via the backlight data bus 108 to enable local dimming of the illumination surface 56. Again optional optical filter 102 may be provided between the illumination surface 56 and the LED display 50 to mix or help smoothly transition the locally dimmed RGB LED pixels 110 to enhance the ultimate picture quality viewed on the LED display 50.

Figure 8:
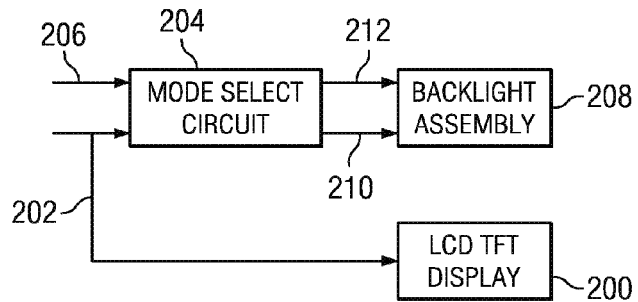
FIG. 8 depicts a diagram of an exemplary electronic block diagram of an LCD display and backlight assembly in accordance with embodiments of the invention.

Referring now to FIG. 8, an electrical block diagram of an exemplary LCD display panel and backlight assembly is shown in accordance with an embodiment of the invention. A full color LCD display 200 is connected to receive graphic data via an LCD data bus 202. The graphic data bus 202 is also provided to a mode select circuit 204. The mode select circuit 204 receives both the graphic data from the LCD data bus 202 and a mode signal from a mode line 206. When the mode signal indicates that an exemplary destination sign is in destination message mode, the mode select circuit 204 receives the graphic data from the LCD data bus 202 and provides the graphic data to the backlight assembly 208 via the backlight data bus 210. The mode select circuit 204 also provides a backlight mode signal 212 to the backlight assembly. The backlight mode signal 212 will indicate to the backlight assembly circuitry that the graphic data on the backlight data bus 210 should be displayed or illuminated on the illumination surface of the backlight assembly 208. Thus when in destination message mode, a same or similar destination message is displayed on both the LCD display 200 and the backlight assembly 208.

Conversely, when the mode signal on the mode line 206 indicates that the exemplary destination sign is to operate in a non-destination message mode, the mode select circuit 204 receives the non-destination message mode signal and provides a backlight mode signal via backlight mode signal line 210 to the backline assembly. Upon receipt of the non-destination message mode signal, the backlight assembly will operate in an RGB white light producing LED mode to backlight the graphic data provided on the LCD data bus 202 that is displayed on the LCD display 200. In some embodiments, while in non-destination message mode the mode select circuit 204 may convert the graphic data to local dimming graphic data that can be provided to the backlight assembly via the backlight data bus. This conversion may be done in various ways including using color/intensity averaging techniques or other techniques already available in the art. Thus, the backlight assembly may also operate in a RGB dynamic LED backlighting mode, which allows dimming to occur in locally specific areas that are indicated as being dark on the LCD display 200. In this mode the RGB LEDs on the illumination surface of the backlight assembly 208 are producing white light at varying or locally dimmed illumination levels.

Figure 9:
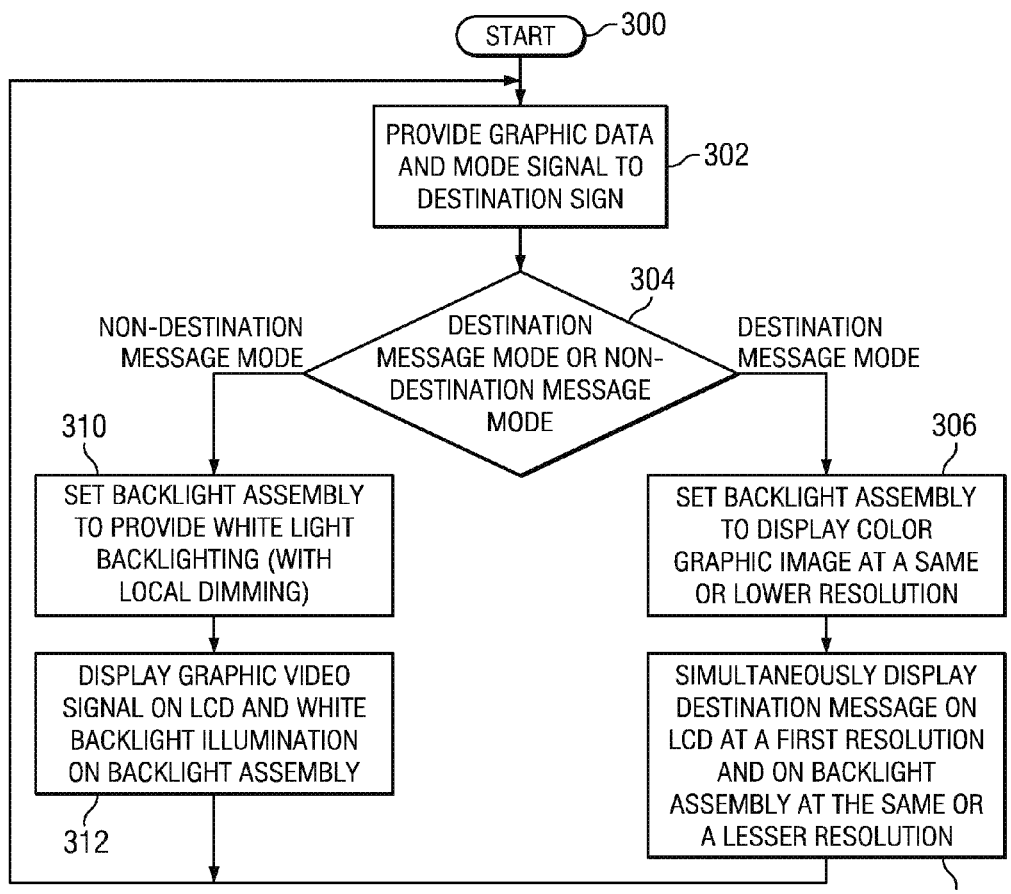
FIG. 9 is a flow diagram of a method of switching an exemplary destination sign between a destination message mode and a non-destination message mode.

Referring now to FIG. 9 a flow diagram of a method of providing an exemplary destination sign having a destination message mode and a non-destination message mode is provided. At step 300 the method begins. At 302 display graphics data and a mode signal provided from an external source to an exemplary destination sign. At step 304 it is determined whether the mode signal indicates that the exemplary destination sign should operate in destination message mode or operate in non-destination message mode. If the mode signal indicates that the exemplary destination sign is to operate in destination message mode, then at step 306 the backlight assembly is set to display a color graphic image that is the same or of a lower resolution as the destination message image to be displayed on the LCD display. At step 308 the destination message is displayed on both the LCD display panel at a first resolution and on the backlight assembly at the same or a lower resolution. At this point the method goes back to step 302 as additional graphic data and mode signals are being provided to the destination sign.

At step 304, if it is determined that the mode signal indicates that the exemplary destination sign is to operate in a non-destination message mode then the method proceeds to step 310. At step 310, the backlight assembly is set to provide white light backlighting and in some embodiments white light backlighting with local dimming. This local dimming type of backlighting may be referred to as RGB dynamic backlighting. At step 312, the graphic data, which may be static or moving digital video graphic data is displayed on the LCD display while the backlight assembly provides a white or locally dimmed white backlight illumination for the LCD display. At this point, the method goes back to step 302 as additional graphic data and mode signals are received by an exemplary destination sign.

It will be appreciated by those skilled in the art having the benefit of this disclosure that this LCD destination sign for on-board use in public transportation vehicles provides a dual mode destination sign having superior LCD display capabilities for creating high contrast, high resolution destination messages in one mode and high resolution color graphics or video graphics displayed on a destination sign viewing screen in a manner not previously seen on a very high aspect ratio screen in the transportation industry. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A destination sign comprising:
   an LCD display panel comprising a display surface, the LCD display panel configured to produce an image having a first resolution;
   a backlight assembly, positioned behind the LCD display panel such that an illumination surface of the backlight assembly faces a backside of the LCD display panel, the illumination surface comprises an array of LEDs configured to produce a first illumination output comprising the image at a second resolution; wherein the second resolution provides the image at a same or lower pixel resolution than the first resolution and configured to produce a second output comprising substantially white light;
   a graphic data bus connection configured to provide a first graphic data signal that comprises the image to the LCD display panel; and
   a mode signal connection configured to provide a mode signal to the backlight assembly, wherein when the mode signal indicates a destination message mode then the first output is produced on the illumination surface, and wherein when the mode signal indicates a non-destination message mode then the second output is produced on the illumination surface.

2. The destination sign of claim 1, further comprising a mode select circuit configured to receive the mode signal and the first graphic data signal, the mode select circuit further configured to provide a second graphic data signal to the backlight assembly when the mode signal indicates a destination message mode, the second graphic data signal comprises the image formatted for display on the illumination surface.

3. The destination sign of claim 2, wherein the mode select circuit is further configured to provide a third graphic data signal to the backlight assembly when the mode signal indicates a non-destination message mode, the third graphic data signal indicates that the illumination surface shall produce substantially white light.

4. The destination sign of claim 2, wherein the mode select circuit is further configured to provide a fourth graphic data signal to the backlight assembly when the mode signal indicates a non-destination message mode, the fourth graphic data signal indicates that the illumination surface shall produce locally dimmed white light.

5. The destination sign of claim 4, further comprising:
a housing, the housing comprising:
   a housing backside;
   housing sidewalls extending forward from the periphery of the housing backside to establish a housing enclosure such that the front bezel assembly interfits within the housing enclosure with the aperture facing forward; and
   means for mounting and adjusting a viewing tilt angle of the front bezel assembly.

6. The destination sign of claim 1, wherein when the mode signal indicates the destination message mode then the first output is produced on the illumination surface in white light, the first illumination output consists of a destination message.

7. The destination sign of claim 1, further comprising:
a front bezel assembly comprising:
   a bezel front side;
   bezel side walls extending backwards from the periphery of the bezel front side to establish a bezel enclosure about the bezel backside; and
   an aperture through the bezel front side to the bezel backside, the LCD display panel being mounted within the bezel enclosure such that the display surface can be viewed through the aperture.

8. The destination sign of claim 1, wherein the mode signal is configured to indicate the destination message mode when the image consists of a destination message.

9. The destination sign of claim 1, wherein the mode signal is configured to indicate the non-destination message mode when the image is a non-destination message or one of a plurality of images that is part of a video.

10. The destination sign of claim 1, wherein the illumination surface comprises an array of RGB LEDs capable of producing illumination images having a resolution ranging from about 10% to 100% of the display resolution of the LCD display panel.

11. The destination sign of claim 1, wherein the array of LED comprises an array of red, green and blue LED or an array of tri-colored LEDs.

12. The destination sign of claim 1, wherein when the mode signal indicates the destination message mode, the combination of the image on the LCD display panel and the first illumination output on the illumination surface produces a visual destination message that meets or exceeds the American Disabilities Act requirements for destination and route signs.

13. The destination sign of claim 1, wherein the destination sign is adapted for mounting on an interior portion of a public-transit vehicle.

14. A destination sign comprising:
a color LCD display panel comprising a front display area, the color LCD display panel adapted to produce a first image at a first resolution for viewing on the front display area;
a backlight assembly, positioned behind the color LCD display panel comprising an illumination surface that faces a backside of the color LCD display panel, the illumination surface comprises an array of red, green and blue (RGB) LEDs configured to produce a first illumination output comprising the first image at a second resolution wherein the second resolution is the same as or a lower resolution than the first resolution and further configured to produce a second illumination output comprising mainly white light;
a graphic data bus, connected to the color LCD display panel, adapted to provide a first graphic data signal, the first graphic data signal comprising the first image for display on the color LCD display panel; and
a mode signal connection configured to provide a mode signal to the backlight assembly, wherein when the mode signal indicates a destination message mode then the first output is produced on the illumination surface, and wherein when the mode signal indicates a non-destination message mode then the second output is produced on the illumination surface.

15. The destination sign of claim 14, further comprising a mode select circuit configured to receive the mode signal and the first graphic data signal, the mode select circuit further adapted to provide a second graphic data signal to the backlight assembly when the mode signal indicates a destination message mode, the second graphic data signal comprises a derivation of the image.

16. The destination sign of claim 15, wherein the mode select circuit is further adapted to provide a third graphic data signal to the backlight assembly when the mode signal indicates a non-destination message mode, the third graphic data signal indicates that the illumination surface shall produce substantially white light.

17. The method of claim 16, further comprising receiving a mode signal by the mode select circuit, the mode signal indicating that the backlight assembly is to be placed in a destination message mode or in a non-destination message mode, wherein when in destination message mode the destination message image is simultaneously displayed on the color LCD display panel and on the backlight assembly.

18. The destination sign of claim 15, wherein the mode select circuit is further adapted to provide a fourth graphic data signal to the backlight assembly when the mode signal indicates a non-destination message mode, the fourth graphic data signal indicates that the illumination surface shall produce locally dimmed white light.

19. The destination sign of claim 14, wherein when the mode signal indicates the destination message mode, then the first output is produced on the illumination surface in white light, the first output consisting of a destination message.

20. A method of displaying a destination message on a backlit LCD display, wherein the backlit LCD destination sign comprises a color LCD display panel and backlight assembly adapted to backlight the color LCD display panel, the method comprising:
receiving an image signal by the backlit LCD display;
determining, by a mode select circuit, whether the image signal is for a destination message image or a non-destination message image;
when the mode select circuit determines that the image is for a destination message image, then simultaneously displaying the destination message image on the color LCD display panel and on the backlight assembly;
when the mode select circuit determines that the first image is for a non-destination message image, then displaying the non-destination message image on the color LCD display panel and illuminating the backlight assembly to produce substantially white light.

* * * * *